Patented June 27, 1944

2,352,253

UNITED STATES PATENT OFFICE 2,352,253

PURIFICATION OF ALIPHATIC ACIDS AND ANHYDRIDES

Frank O. Cockerille, Albemarle County, Va., assignor to E. I. du Pont de Nemours & Company, Wilmington, Del., a corporation of Delaware No Drawing. Application March 21, 1941,
Serial No. 384,580

4 Claims. (Cl. 260—546)

This invention relates to the purification of aliphatic acid anhydrides and aliphatic acids, and more particularly to the treatment of acetic anhydride to remove therefrom impurities which color and otherwise deleteriously affect the anhydride and products produced therefrom.

It has been determined that the commercial or technical grades of acetic anhydride and acetic acid contain impurities which impart undesirable color to, and impair the clarity of cellulose acetate. This is demonstrated by the fact that when cellulose is acetylated with pure acetic anhydride in the presence of pure acetic acid and sulfuric acid as the catalyst, the cellulose acetate product is much improved in color and clarity as compared with cellulose acetate produced with technical grade of acetic anhydride.

While for some uses a high degree of clarity and the absence of color in the cellulose ester may be unnecessary, for the production of transparent film such as photographic film and for the production of transparent or lightly tinted plastics, freedom from every trace of color and impurities effecting even a slight clouding or coloring of cellulose acetate becomes important, and it is therefore desirable that those impurities which lend color and deleteriously affect clarity be removed from the anhydride and acid which are to be used in the production of the ester.

An object of this invention is to provide a method for effectively removing from acetic anhydride those impurities which undesirably color and impair the clarity of certain derivatives, particularly cellulose acetate. A further object is to substantially purify technical grades of acetic anhydride and acetic acid by a convenient and economical treatment. A still further object is to purify aliphatic acid anhydrides and aliphatic acids in general. These and other objects will more clearly appear hereinafter.

These objects are accomplished by the process of the present invention which, briefly stated, comprises adding a small amount of sulfuric acid to the impure aliphatic acid anhydride or acid in one or more stages, heating the mixture in each stage for a period of time sufficient to complete the reaction, the reaction temperature during the last stage not to exceed 60° C., thereafter neutralizing the reaction mixture with an alkali or alkaline earth metal salt of the acid corresponding to the anhydride or acid under treatment, and finally isolating the anhydride or acid substantially free from impurities by distillation.

In the preferred practice of the process, which will be described in connection with the purification of impure acetic anhydride, a total of from about 0.2% to about 2.0% by weight of concentrated sulfuric acid based on the weight of the acetic anhydride is added to acetic anhydride in two stages. During the first stage the mixture is gradually heated to a temperature in excess of 60° C., and preferably to the boiling point of the reaction mixture, during a period of about three hours. The reaction mixture is then cooled and the final portion of concentrated sulfuric acid is added, and the temperature is maintained within the range of about 50° to about 55° C. for a sufficient length of time to complete the reaction. Anhydrous sodium acetate is added to neutralize all traces of acid, the solids are allowed to settle, and the clear liquid is separated and subjected to distillation, preferably at reduced pressure, in order to isolate the substantially pure acetic anhydride.

The invention is further illustrated by the following examples wherein parts are by weight unless otherwise stated.

Example I

Five hundred (500) parts of 98% acetic anhydride having a permanganate index of $62 \times 10^{-4}$ was treated at 25° C.±5° with 3 parts of concentrated sulfuric acid. The temperature was raised gradually to between 50° and 55° C. and maintained there for two hours. Five (5) parts of anhydrous sodium acetate were added and the mixture agitated during one-half hour while the temperature was held constant. The temperature was then raised gradually to 80° C. during the next half hour while the agitation was continued, after which the anhydride was distilled rapidly at atmospheric pressure, taking care that no local overheating took place. The distillate was found to consist of 97.5% acetic anhydride with a permanganate index of $5 \times 10^{-4}$. A deep orange color developed when 5 parts of the distillate were treated with 1 part of 50% perchloric acid. A cooled mixture of equal parts of distillate and concentrated sulfuric acid produced a faint orange color after one-half hour.

The "permanganate index" referred to in the foregoing example is a standard index for indicating the purity of acetic anhydride and is arrived at in accordance with the following procedure:

A small measured or weighed sample of the anhydride is hydrolyzed to acetic acid by treatment with a large excess of dilute sulfuric acid. The dilute acetic acid-sulfuric acid solution obtained in this manner is titrated with a solution containing an exactly known amount of potassium permanganate per given volume of the solution, usually about 3.2 grams per liter. When a faint pink color persists for fifteen minutes, the titration is considered to be complete. The volume of solution used during the titration is read and the weight of permanganate contained therein determined. The "permanganate index" is then expressed as "the number of grams of potassium permanganate consumed per gram of anhydride in the titrated sample."

*Example II*

Three thousand (3000) parts of 95% acetic anhydride having a permanganate index of $85\times10^{-4}$ were treated at 50° C.±3° with 30 parts of concentrated sulfuric acid. A temperature of 52° C.±3° was maintained for five hours. Forty-five (45) parts of anhydrous sodium acetate were added with agitation. After one hour the temperature was raised to 100° C. while the agitation was continued. The mixture was distilled under a pressure of about 100 mm. of mercury. The distillate consisted of 94% acetic anhydride having a permanganate index of $3\times10^{-4}$. The perchloric acid color was orange. The sulfuric acid color developed after one hour.

*Example III*

One thousand (1000) parts of 97–98% acetic anhydride having a permanganate index of $55\times10^{-4}$ was treated at room temperature with 5 parts of concentrated sulfuric acid. The temperature was raised to 50° C. and held between 50° and 55° C. during one hour, then raised over a period of one hour to the boiling point of the anhydride. After one hour of refluxing the mixture was cooled quickly to 50° C.±5° and treated with a further portion of 3 parts of concentrated sulfuric acid. After three hours at 50° C. (not over 55°) the mixture was treated with 12 parts of anhydrous sodium acetate while brisk agitation was maintained. After a further half hour at 50°–55° C. with agitation, the temperature was raised gradually to 100° C. The precipitate was allowed to settle and the clear liquor transferred to another vessel for distillation. Vacuum was applied until distillation commenced. The extent of the vacuum was increased gradually so that the greatest portion of the anhydride was distilled at from 70° to 80° C. The distillate consisted of 97% acetic anhydride. The permanganate index was $0.8\times10^{-4}$, the perchloric acid color pale yellow, and the sulfuric acid color did not develop in twenty-four hours.

*Example IV*

As in Example III, except that the first portion of sulfuric acid was 3 parts and the second portion 5 parts. The permanganate index of the distillate was $1.5\times10^{-4}$, the perchloric acid color deep yellow, and the sulfuric acid color developed in twenty hours.

*Example V*

As in Example III, except that two portions of sulfuric acid, each consisting of 3 parts, were used during the purification. In this case the permanganate index was $2.2\times10^{-4}$, the perchloric acid color pale orange, and the sulfuric acid color developed in about eight hours.

*Example VI*

One thousand (1000) parts of acetic acid having a freezing point of 16.4 and a permanganate index of $3\times10^{-4}$ was treated at 60° C. with 1 part of concentrated sulfuric acid. The mixture was kept at 60° C.±5° for three hours, then treated with 3 parts of anhydrous sodium acetate and heated to boiling to complete the neutralization. The clear liquor was decanted and a sample was distilled. The permanganate index of the distillate was $1.5\times10^{-4}$.

While the process has been described in the above examples with specific reference to acetic anhydride, it is not so limited and may be applied as well in the purification of all aliphatic acids and anhydrides, such as propionic, butyric, and isobutyric acids and anhydrides. Likewise a wide variation from the exact amounts and conditions of the above examples may be practiced.

Thus, while the amount of concentrated sulfuric acid used in this purification process is preferably within the range of from 0.2% to 2.0% based on the weight of the anhydride, some improvement will be obtained in the purity of the product by using a smaller amount than 0.2%. Amounts of concentrated sulfuric acid in excess of 2.0% will further improve the purity of the anhydride, but the improvement is not in proportion to the increase in the amount of acid and, in general, the degree of improvement is not sufficiently great to justify the expenditure of acid. In purifying acetic anhydride to be used in the preparation of cellulose acetate of film-forming quality, about 0.5% of concentrated sulfuric acid is to be preferred.

The reaction temperature with the final portion of sulfuric acid must not exceed 60° C., nor should it be held in the neighborhood of this temperature for more than two or three hours.

The time required for the reaction will of course depend upon a number of variables, including the nature of the impurities, the temperature of treatment, and the amount of sulfuric acid used, and may be determined in each instance by simple empirical tests.

Ample alkali or alkaline earth metal salt of the acid corresponding to the anhydride or acid must be used to prevent formation of even traces of mineral acidity during the distillation.

Obviously, sulfuric acid of other than ordinary concentrated strength may be used. Weaker strengths will inevitably lead to dilution of the anhydride, however, whereas there is no particular advantage to be gained by the use of fuming sulfuric acid.

I claim:

1. A process for purifying aliphatic acid anhydrides which comprises adding a relatively small amount of sulfuric acid to a relatively large amount of impure aliphatic acid anhydride in two stages, heating the reaction mixture in the first stage to a temperature between 60° C. and the boiling point of the anhydride, maintaining the temperature in the second stage below 60° C., thereafter adding a salt from the group consisting of alkali and alkaline earth metal salts of the acid corresponding to the anhydride, in amount sufficient to neutralize all traces of mineral acid in the reaction mixture, and distilling said reaction mixture whereby to separate the aliphatic acid anhydride in substantially pure state.

2. A process according to claim 1 wherein the aliphatic acid anhydride is acetic anhydride.

3. A process for purifying acetic anhydride which comprises adding a relatively small amount of sulfuric acid to a relatively large amount of acetic anhydride, heating the mixture to a temperature between 60° C. and the boiling point of the anhydride to promote reaction, cooling the reaction mixture, adding another relatively small amount of concentrated sulfuric acid to the reaction mixture, the total amount of sulfuric acid added being about 0.5% by weight based on the acetic anhydride, heating to a temperature not in excess of 60° C. to complete the reaction, thereafter adding sufficient anhydrous sodium acetate to neutralize all traces of mineral acid in the reaction mixture, and then distilling the reaction mixture whereby to obtain substantially pure acetic anhydride.

4. A process for purifying aliphatic acid anhydrides which comprises adding a relatively small amount of sulfuric acid to a relatively large amount of impure aliphatic acid anhydride in a plurality of successive stages, heating the reaction mixture in each stage prior to the final stage to a temperature between 60° C. and the boiling point of the anhydride, maintaining the temperature in the final stage below 60° C., thereafter adding a salt from the group consisting of alkali and alkaline earth metal salts of the acid corresponding to the anhydride, in amount sufficient to neutralize all traces of mineral acid in the reaction mixture, and distilling said reaction mixture whereby to separate the aliphatic acid anhydride in substantially pure state.

FRANK O. COCKERILLE.